United States Patent [19]

Taylor

[11] Patent Number: 5,787,981
[45] Date of Patent: Aug. 4, 1998

[54] OIL FIELD CONVERTING AXIAL FORCE INTO TORQUE

[76] Inventor: William T. Taylor, 1412 Cottage Dr., Houma, La. 70360

[21] Appl. No.: 618,362

[22] Filed: Mar. 19, 1996

[51] Int. Cl.$^6$ .................................................. E21B 33/14
[52] U.S. Cl. ............................................. 166/237; 74/88
[58] Field of Search .......................... 166/237; 74/57, 74/88; 285/330, 922

[56] References Cited

U.S. PATENT DOCUMENTS

| | | | |
|---|---|---|---|
| 2,941,424 | 6/1960 | Dixon | 74/88 X |
| 3,587,333 | 6/1971 | Duncan | 74/88 |
| 3,703,104 | 11/1972 | Tamplen | 74/88 |
| 4,256,179 | 3/1981 | Shillander | 166/237 |
| 4,727,763 | 3/1988 | Georget | 74/88 X |
| 5,048,612 | 9/1991 | Cochran | 166/237 X |
| 5,085,479 | 2/1992 | Taylor | 294/86.17 |

*Primary Examiner*—William P. Neuder
*Attorney, Agent, or Firm*—Roy, Kiesel & Tucker

[57] ABSTRACT

The present invention provides a tool for converting axial force into torque comprising a body and set teeth positioned on the body. The tool also has a mandrel positioned to move relative to the body and drive teeth positioned on the mandrel such that there is relative motion between said set teeth and said drive teeth. When the set teeth and drive teeth engage, torque is applied to the mandrel.

20 Claims, 4 Drawing Sheets

OIL FIELD CONVERTING AXIAL FORCE INTO TORQUE

BACKGROUND OF INVENTION

This invention relates to oil field tools that are employed down hole in oil and gas wells. More particularly, this present invention relates to devices which provide rotational motion to the down hole tool without rotating the entire work string.

There are several instances in oil well drilling operations when it is necessary to provide rotational motion to the tool connected to the end of the work string. Of course, if the work string consists of conventional drill pipe, the entire work string may be rotated as is done during normal drilling operations. However, in many situations, rotating the work string is not a satisfactory method of providing rotational motion at the bottom of the work string where an oil well tool is located. This is because the work string often cannot be rotated slowly enough to perform the operations required. Additionally, if the work being done is a wireline operation, the work string consists of a cable type material which cannot transmit torque.

Rather than using the work string to provide torque, the drilling industry has developed devices that travel down hole with the tool and provide torque to the tool without rotating the work string. One such device is commonly referred to as a "mud motor". Mud motors typically operate by flowing pressurized drilling mud over a cork-screw shaped member which imparts a rotational force to the motor. However, mud motors do not operate effectively at low rpm and therefore are not suitable for applications requiring lower rotational speeds. Additionally, because mud motors are operating on pressurized flow, mud motors often cannot develop as much torque as devices that operate by mechanical contact of the moving elements.

One application requiring slow and controlled rotation is the retrieving of a lost tool or "fish" when the fish is tilted in the hole at an off-center angle. When the fishing tool is lowered into the hole, it may be difficult to grip the fish since the fish is not in straight up and down alignment with the well hole. There exist special tools, such as a cut-lip guide, which are designed to "scrape" the tilted tool off the side of the well casing wall and align the fish in an upright position. However, there must be some means for rotating the cut-lip guide in order that it may function as intended.

If rotating the work string or employing a mud motor is used to rotate the cut-lip guide, there is a strong possibility that the rapid rotation will damage the fishing tool to the extent that it cannot operate. Therefore a device such as the present invention generating comparatively low speed rotation would be well suited for use with a cut-lip guide.

A device converting axial motion into torque would also have application in situations where a fish is stuck downhole in sand. The sand will often have a suction effect when trying to pull the fish upwards. A device attached to the fish which rotates the fishing tool would dissipate the suction effect and assist in freeing the fish.

Another application for a slow rotation, high torque generating tool would be to "back off of" or unscrew connections in a work string made up of drill pipe. This is particularly important in situations where a fishing tool at the end of the work string has latched onto a fish, but cannot dislodge the fish. A device allowing the work string to back off of the fishing tool would allow the remainder of the work string to be withdrawn.

Another application of a tool producing high torque would be to extend the operating length of a work string. If torque is applied to the work string only by the rotary table at the surface of the well, there is a limit on how long the work string may be because torque is lost due to strain as the length of work string increases. At some point, the torque necessary to rotate the bottom of the string is beyond the torsional strength of the threaded connections at the top of the work string. If a device placed at the bottom of the string could produce torque independently of that produced by the rotary table, then the effective length of the work string could be greatly increased.

What is needed in the art is a tool that can provide slow and controlled torque down hole in the well bore independently of the torque produced by the rotary table. There is also a need for a tool that can provide more torque than conventional mud motors. It would be a significant improvement if such a tool was simple, reliable and utilized the up and down axial motion of raising and lowering the work string to provide torque to a connected tool at the bottom of the well bore.

SUMMARY OF THE INVENTION

It is an object of this invention to provide a torque generating oil field tool that converts axial motion into torque.

It is another object of this invention to provide a tool that can provide slower a more consistent rotation than heretofore known in the art.

It is still another object to provide a tool that can develop more torque than conventional torque producing tools.

Therefore, the present invention provides a tool for converting axial force into torque comprising a body and set teeth positioned on said body. The tool also has a mandrel positioned to move relative to said body and drive teeth positioned on said mandrel such that there is relative motion between said set teeth and said drive teeth.

DETAILED DESCRIPTION

Structure of Tool

Figure 1:
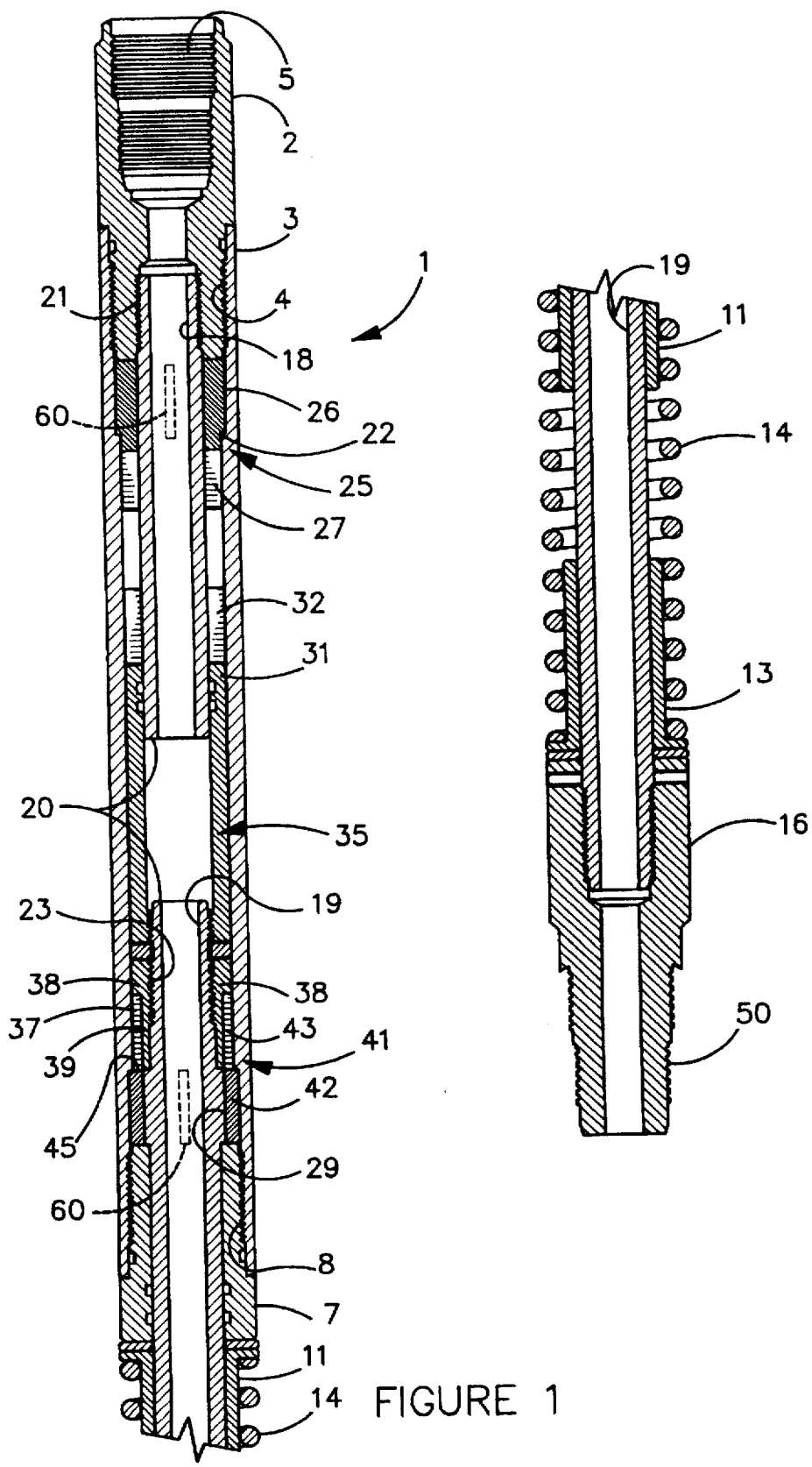
FIG. 1 is a cut-away view of the invention when the drive ratchet is engaging the lower set teeth.

FIG. 1 is a cut-away view of the present invention, tool 1. Beginning with the upper section of tool 1, the outer structure of tool 1 comprises top sub 2 engaging outer body 3 by way of threaded surface 4. Top sub 2 also has internal threads 5 which provide the means for connecting tool 1 to a work string (not shown).

Outer body 3 continues down the length of tool 1 until it terminates at lower cap 7. Lower cap 7 engages outer body 3 by way of threads 8. The numerous elements inclosed in outer body 3 are described in greater detail below. However, two elements internal to outer body 3 that should be mentioned at this point are upper wash tube 18 and lower wash tube 19. Upper wash tube 18 engages top sub 2 by way of threaded portion 21 and extends downwards, but does not connect with lower wash tube 19. Lower wash tube 19 begins inside of outer body 3 and extends from outer body 3 through lower cap 7. While wash tubes 18 and 19 are not connected, they may generally be referred to either together or singularly as comprising mandrel 20.

Below and adjacent to lower cap 7 is upper spring sleeve 11 through which lower wash tube 19 extends. Further down lower wash tube 19 is lower spring sleeve 13. Spring 14 is positioned along lower wash tube 19 between upper spring sleeve 11 and lower spring sleeve 13. Attached to the lower threaded end of wash tube 19 is bottom sub 16. Bottom sub 16 in turn also has a threaded end 50 which is used to connect various conventional oil field tools such as fishing tools to tool 1.

Figures 3, 4, 5:
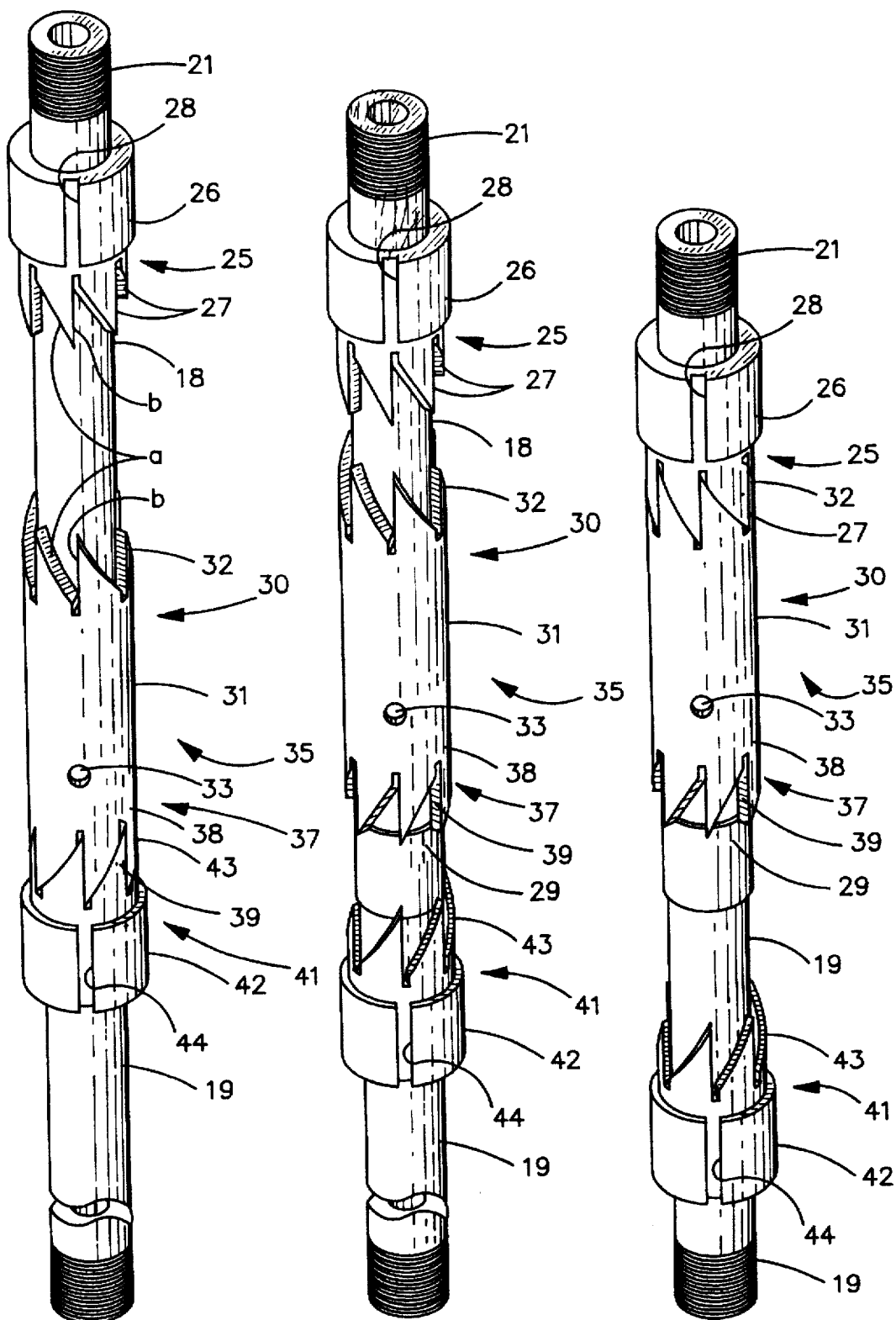
FIG. 3 is a perspective view of the internal elements of the invention when the drive ratchet is engaging the lower set teeth.
FIG. 4 is a perspective view of the internal elements of the invention when the drive ratchet is in a middle position.
FIG. 5 is a perspective view of the internal elements of the invention when the drive ratchet is engaging the upper set teeth.

Returning to the internal elements positioned inside of outer body 3, threaded portion 21 of upper wash tube 18 engages top sub 2. For ease of understanding, FIGS. 3–5 are perspective views of the internal elements of tool 1 in different positions. Of these figures, FIG. 3 is probably the easiest from which to distinguish the different elements illustrated. In these figures, top sub 2, outer body 3, lower cap 7 and all elements below lower cap 7 have been removed. FIGS. 3–5 represent upper wash tube 18, lower wash tube 19 and the elements attached thereto. Positioned adjacent to the threaded portion 21 of wash tube 18 are upper set teeth 25. Upper set teeth 25 comprise teeth base ring 26 with a plurality of teeth 27 extending from teeth base ring 26. As shown in FIG. 3, teeth 27 have two surfaces, an inclined surface a and a vertical surface b. As seen from the figures, all other series of teeth discussed herein will have similar inclined and vertical surfaces.

Figure 6:
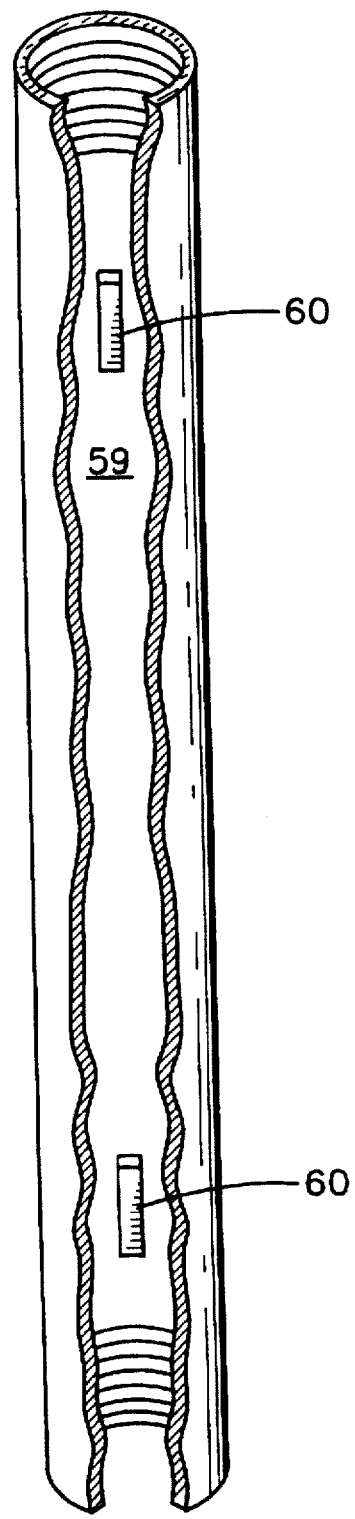
FIG. 6 is a cut-away view of the inner surface of the outer body illustrating a teeth locking spline.

Viewing FIG. 4, a locking groove 28 is formed in teeth base ring 26. While upper set teeth 25 are not fixed to wash tube 18, upper set teeth 25 will not be able to move when positioned in outer body 3. As seen from FIG. 1, teeth base ring 26 of upper set teeth 25 rests on an internal shoulder 22 of outer body 3. When top sub 2 is screwed into outer body 3, upper set teeth 25 are securely held between internal shoulder 22 and top sub 2. Additionally, locking groove 28 (seen in FIGS. 3–5) will engage a spline on the internal surface 59 of outer body 3 and thereby prevent upper set teeth 25 from rotating in place. Spline 60 is best seen in FIG. 6 which illustrates internal surface 59 of outer body 3.

Still viewing FIG. 4, it can be seen that another set of teeth is positioned on wash tube 18 below upper set teeth 25. These teeth are upper drive teeth 30 which include drive teeth base ring 31 and teeth 32. Below upper drive teeth 30 are lower drive teeth 37 which include drive teeth base ring 38 and teeth 39. In the embodiment shown, upper drive teeth 30 and lower drive teeth 37 are formed as a single unit and are referred to as drive ratchet 35. As best seen in FIG. 1, drive ratchet 35 is attached to the upper end of lower wash tube 19 by way of threads 23. This set screw is a precautionary measure to insure that the torque imparted to upper drive teeth 30 by upper set teeth 25 (explained below), does not tend to loosen drive ratchet 35 from threads 23. A aperture 33 will allow insertion of a set screw to prevent rotation of drive ratchet 35 on threads 23. Viewing FIG. 4, it can also be seen that a band 29 is positioned on lower wash tube 19 immediately below lower drive teeth 37. When the ratchet drive is in the lower position seen in FIGS. 1 and 3, the lower shoulder of band 29 will rest on lower cap 7 (see FIG. 1). As discussed below, band 29 will prevent the teeth of lower drive teeth 37 and lower set teeth 41 from coming together with excessive force.

While upper wash tube 18 engages the upper end of drive ratchet 35, it does so by sliding into the tubular internal section of drive ratchet 35. Therefore, wash tube 18 is not rigidly fix on drive ratchet 35 as lower wash tube 19 is to drive ratchet 35, but rather lower wash tube 18 can slide in and out of drive ratchet 35.

Again viewing FIGS. 3–5, lower set teeth 41 are positioned below drive ratchet 35. Like upper set teeth 25, lower set teeth 35 have a teeth base ring 42, teeth 43, and locking groove 44. As seen in FIG. 1, lower set teeth 41 are held in a fixed position between internal shoulder 45 of outer body 3 and lower cap 7. Additionally, a spline (not shown) on the internal surface of outer body 3 engages locking groove 44 in order to prevent lower set teeth 41 from rotating.

Operation of Tool

In operation, tool 1 will be employed by the work string engaging threaded portion 5 of top sub 2 (see FIG. 1). Typically another type of tool (e.g. a fishing tool) will be positioned below tool 1 by being screwed onto threads 50 of bottom sub 16. The entire assembly will then be lowered down hole on the work string.

The operator who is lowering the string down hole knows the weight of the work string and can monitor a gauge indicating this weight. When the work string comes into contact with the bottom of the bore or some obstruction in the bore, the operator is aware of this by the gauge indicating a decrease in the weight of the work string.

As tool 1 proceeds down hole, it will be in the position shown in FIG. 1 with spring 14 being in the relaxed state. At this time, drive ratchet 35 will be in the position shown in FIG. 3 with lower drive teeth 37 engaging lower set teeth 41. When the lowermost tool attached to the work string reaches the intended obstruction in the well hole (e.g. the fish), the weight of the work string will bear down on tool 1. When the work string consists of drill pipe or coil tubing, the weight of the work string provides a sufficient downward force. If the work string is wireline, then weight bars will be positioned above tool 1. As mentioned above, the operator is aware of this because the gauged weight of the string decreases. As the work string weight begins to compress spring 14, outer body 3 and the elements attached thereto begin to move downwardly. Since upper wash tube 18 is not attached to drive ratchet 35, it slides downwardly inside of drive ratchet 35. Not only does upper wash tube 18 move downwardly with outer body 3, but also upper set teeth 25 and lower set teeth 41 do so since they are fixed in outer body 3.

Figure 2:
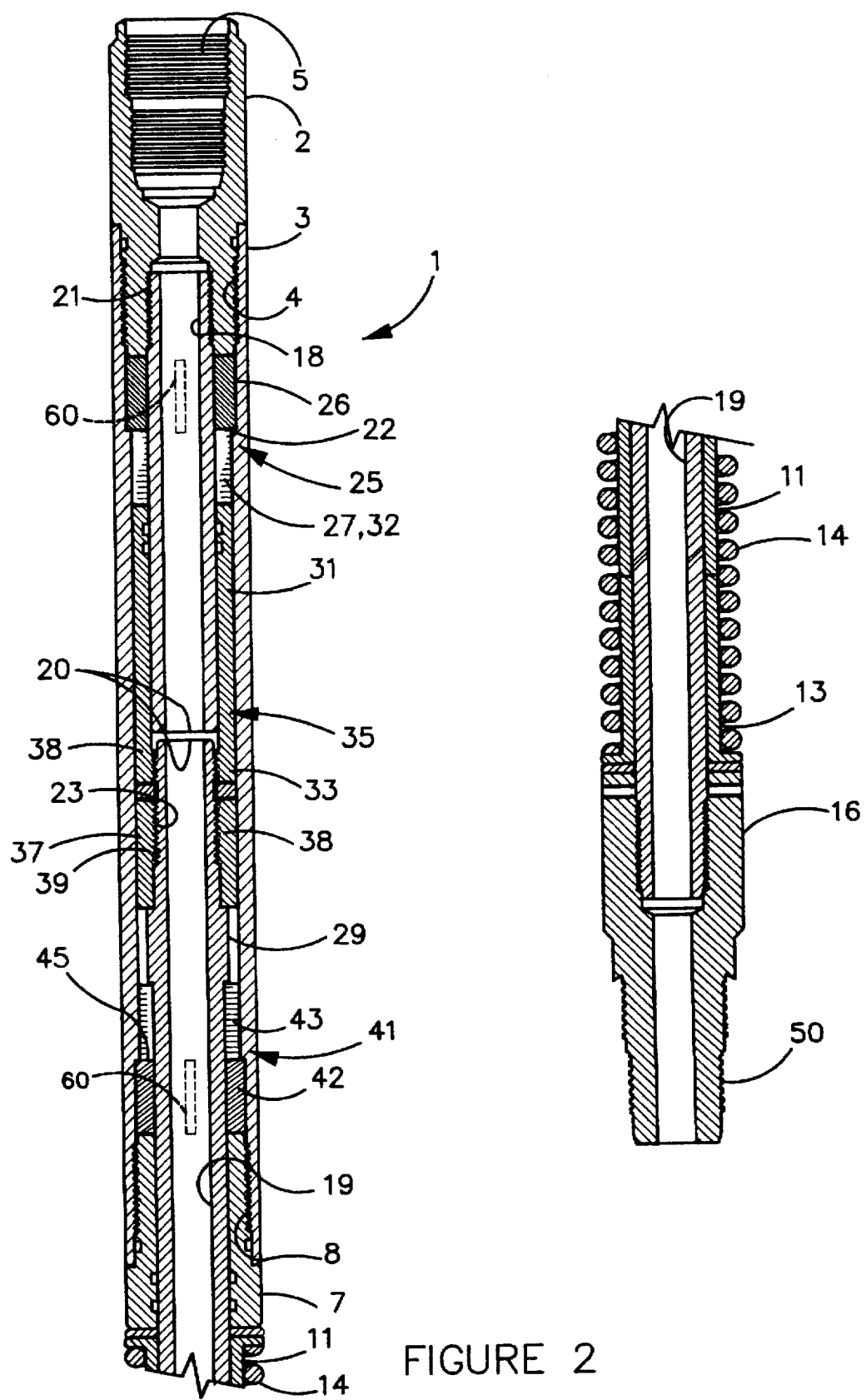
FIG. 2 is a cut-away view of the invention when the drive ratchet is engaging the upper set teeth.

FIG. 4 shows upper set teeth 25 as they move downwardly towards drive ratchet 35. As upper set teeth 25 continue downward, teeth 27 will begin to engage teeth 32 of upper drive teeth 30. FIG. 2 illustrates the entire tool when teeth 32 are fully engaged with teeth 27. It can be seen that even at its lowermost position, upper wash tube 18 will not contact lower wash tube 19. However, as also seen in FIG. 2, upper spring guide 11 and lower spring guide 13 do come into contact as upper set teeth 25 fully engage upper drive teeth 30. Upper spring guide 11 and lower spring guide 13 are sized such that they will engage just prior to upper set teeth 25 fully engaging upper drive teeth 30. In the embodiment shown, this leaves upper set teeth 25 and upper drive teeth 30 approximately 1/64th of an inch short of full engagement. In this manner, teeth 27 and 32 are not damaged when upper set teeth 25 and upper drive teeth 30 forcefully come together.

Returning to FIG. 3, it will be understood that as the inclined surfaces of teeth 32 and 27 begin to slide along each other, a rotational force will be applied to upper set teeth 25 and upper drive teeth 30. However, as discussed above, upper set teeth 25 are fixed in place by locker groove 28 engaging a spline on the internal surface of outer body 3, thereby preventing any rotation of upper set teeth 25. Since upper set teeth 25 cannot rotate, all rotational motion will be imparted to upper drive teeth 30. This motion is also imparted to drive ratchet 35 and lower wash tube 19 which is fixed to drive ratchet 35.

The amount of rotation imparted to drive ratchet 35 and lower wash tube 19 depends on the number of teeth comprising upper set teeth 25 (it being understood that the number of teeth typically will be the same on upper set teeth 25, upper drive teeth 30, lower drive teeth 37, and lower set teeth 41). In the embodiment shown, six individual teeth make up a series of teeth. Therefore, when upper set teeth 25 and upper drive teeth 30 engage, drive ratchet 35 is rotated approximately ⅙th of 360° or approximately 60°. As is explained below, the rotation is actually somewhat less than 60° because of the action of lower set teeth 41. For now it is sufficient to understand that the amount of rotation will approximately correspond to 360° divided by the number of teeth. While the present embodiment shows 6 teeth, the number of teeth could be more than 6 or less than 6. It is preferred that the number of teeth be between 4 and 12, but the number may also be greater than 12 or less than 4.

After upper set teeth 25 and upper drive teeth 30 have fully engaged and drive ratchet 35 has fully rotated as seen in FIGS. 2 and 5, it is desired to allow drive ratchet 35 to resume its starting position with lower drive teeth 37 engaging lower set teeth 41 as shown in FIGS. 1 and 3. This is accomplished by lifting up on the work string and removing the weight on tool 1. The operator will know when this has occurred since his string weight gauge will again indicate the full weight of the string. As the work string is lifted, spring 14 will move into its relaxed state, moving outer body 3 upward (along with upper set teeth 25 and lower set teeth 41) to the position in which lower drive teeth 37 are again engaging lower set teeth 41. As mentioned above, band 29 positioned on lower wash tube 19 will engage lower cap 7 just prior to lower drive teeth 37 fully engaging lower set teeth 41. It will be understood that band 29 and lower cap 7 act in the same manner as upper and lower spring guides 11 and 13 as described above. Thus band 29 prevents teeth 39 and 43 from being damaged by the force of lower drive teeth 37 engaging lower set teeth 41.

It is important to note that lower set teeth 41 are not perfectly aligned with upper set teeth 25, but are purposely offset from upper set teeth 25. In the embodiment shown, this offset is approximately 3° in the direction that drive ratchet 35 is being rotated. The effect of this offset is to insure that, as lower drive teeth 37 fully engage lower set teeth 41, the drive ratchet 35 will continue to rotate slightly beyond the point at which it was disengaged from upper set teeth 25. If drive ratchet 35 were not rotated slightly more after disengaging upper set teeth 25, it would be possible that on the next downward stroke of upper set teeth 25 the points of upper set teeth 25 and upper drive teeth 30 would collide, damaging both series of teeth. The additional rotation also insures that when teeth engage other teeth, the contact will be along the inclined surfaces a of the teeth as intended rather than the vertical surfaces b. If the teeth engage along the vertical surfaces of b, no rotational motion will occur.

This slight continued rotation of drive ratchet 35 explains the previously mentioned fact that the drive ratchet 35 rotates less than 60° when upper set teeth 25 and upper drive teeth 30 fully engage one another. Since lower set teeth 41 have already rotated drive ratchet 35 approximately 3°, upper set teeth 25 will only rotate drive ratchet 35 approximately 57°. Of course, those skilled in the art will recognize that lower set teeth 41 could be offset from upper set teeth 25 by amounts greater or lesser than 3°.

Once the weight of the work string has been removed from tool 1 and drive ratchet 35 is engaging lower set teeth 41 as shown in FIGS. 1 and 3, tool 1 is ready to begin another cycle of operation and to rotate another approximately 57°. This next rotation is initiated by again letting the weight of the work string bear down on tool 1. This process can be continued as long as necessary to achieve the amount of rotation desired.

The above embodiment has described rotation in one direction. Those skilled in the art will recognize that if the inclination of the teeth are reversed, then tool 1 can rotate in the opposite direction. The teeth can be quickly be replaced by breaking tool 1 down and replacing all series of teeth with teeth having an opposite inclination. This reversed rotation can be used to "back off" connections as described above. When backing off of connections, the present invention will typically be used in combination with a jar. The jar will be positioned above tool 1 on the work string. The jar provides a strong, sudden axial force which tool 1 turns into a similar torque. This type of torque is well suit for loosening tightly connected threaded joints.

While the device for causing rotation has been described above in terms of "teeth", those skilled in the art will recognize that many types of gears or other devices could be used to accomplish the same transfer of motion. All such devices are intended to be included in the foregoing use of the term "teeth".

Furthermore, the above embodiment's description of set teeth fixed to the outer body and drive teeth moving in the body should not limit the scope of the present invention. It is intended that the present invention cover any embodiment of set teeth moving relative to drive teeth, regardless of which series of teeth are fixed to the body of the tool.

Finally, it is anticipated that still further alterations and modifications thereof will no doubt become apparent to those skilled in the art. It is therefore intended that the following claims be interpreted as covering all such alterations and modifications as fall within the true spirit and scope of the invention.

I claim:

1. A device for converting axial force into torque comprising:
   a) a body;
   b) an upper series of set teeth and a lower series of set teeth positioned on said body;
   c) a mandrel positioned to move relative to said body;
   d) drive teeth positioned on said mandrel such that there is relative motion between said set teeth and said drive teeth, whereby when said set teeth engage said drive teeth, a rotation is produced between said body and said mandrel.

2. A device according to claim 1, wherein said set teeth, said mandrel and said drive teeth are positioned within said body.

3. A device according to claim 1, wherein said drive teeth comprise an upper series of drive teeth and a lower series of drive teeth.

4. A device according to claim 1, wherein said drive teeth are positioned on a drive ratchet.

5. A device according to claim 4, wherein said drive ratchet has an upper series of drive teeth and a lower series of drive teeth.

6. A device according to claim 5, wherein an upper series of set teeth and a lower series of set teeth are fixedly positioned on said body and said drive ratchet is fixedly positioned on said mandrel.

7. A device according to claim 1, wherein said body is sized to be positionable in an oil well bore.

8. A device for converting axial force into torque comprising:
   a) a body sized to be positionable in an oil well bore and having an end adapted for connection with a drill string;
   b) set teeth fixedly positioned inside said body;
   c) a mandrel slidably positioned inside said body;
   d) drive teeth positioned on a drive ratchet, said drive ratchet being fixedly positioned on said mandrel, whereby when said drive teeth engage said set teeth rotation is produced between said body and said mandrel.

9. A device according to claim 8, wherein said set teeth comprise an upper series of set teeth and a lower series of set teeth.

10. A device according to claim 9, wherein said body has a top sub attached to a first end and a lower cap attached to an opposite end.

11. A device according to claim 9, wherein said mandrel extends through a spring positioned below said body.

12. A device according to claim 9, wherein a bottom sub is connected to one end of said mandrel.

13. A device according to claim 9, wherein said mandrel further comprises a lower wash tube and a separate upper wash tube, said upper wash tube being fixedly positioned relative to said body.

14. An oilfield tool for converting axial force into torque comprising:
   a) a body having an end adapted for connection with a drill string;
   b) set teeth positioned on said body;
   c) a mandrel including a wash tube, said wash tube being positioned to move relative to said body; and
   d) drive teeth positioned on said mandrel such that there is relative motion between said set teeth and said drive teeth, whereby when said set teeth engage said drive teeth, a rotation is produced between said body and said mandrel.

15. An oilfield tool according to claim 14, wherein said set teeth comprise upper and lower set teeth fixedly positioned in said body.

16. An oilfield tool according to claim 15, wherein said drive teeth comprise upper and lower drive teeth positioned on a drive ratchet.

17. An oilfield tool according to claim 16, wherein said drive ratchet is fixedly connected to said wash tube.

18. An oilfield tool according to claim 17, wherein said wash tube is a lower wash tube and said body further has an upper wash tube fixedly positioned thereon.

19. An oilfield tool according to claim 18, wherein said body has a top sub adapted for connection with a drill string and a bottom sub connected to said lower wash tube, said bottom sub being adapted for connection with an oilfield tool.

20. An oilfield tool according to claim 19, wherein a spring is positioned around said lower wash tube between said body and said bottom sub.

* * * * *

UNITED STATES PATENT AND TRADEMARK OFFICE
CERTIFICATE OF CORRECTION

PATENT NO. : 5,787,981

DATED : August 4, 1998

INVENTOR(S) : William T. Taylor

It is certified that error appears in the above-identified patent and that said Letters Patent is hereby corrected as shown below:

On the title page, item [54] and column 1, line 1

--Oil Field Tool For Converting Axial Force Into Torque--

Signed and Sealed this

Fifteenth Day of December, 1998

Attest:

BRUCE LEHMAN

*Attesting Officer*    *Commissioner of Patents and Trademarks*